Feb. 28, 1939.　　A. G. PERSSON ET AL　　2,148,835
LAWN MOWER
Filed July 2, 1938　　2 Sheets-Sheet 1

Inventors
A. G. Persson,
C. T. Fornstrom.
Attorney

Feb. 28, 1939.  A. G. PERSSON ET AL  2,148,835
LAWN MOWER
Filed July 2, 1938  2 Sheets-Sheet 2
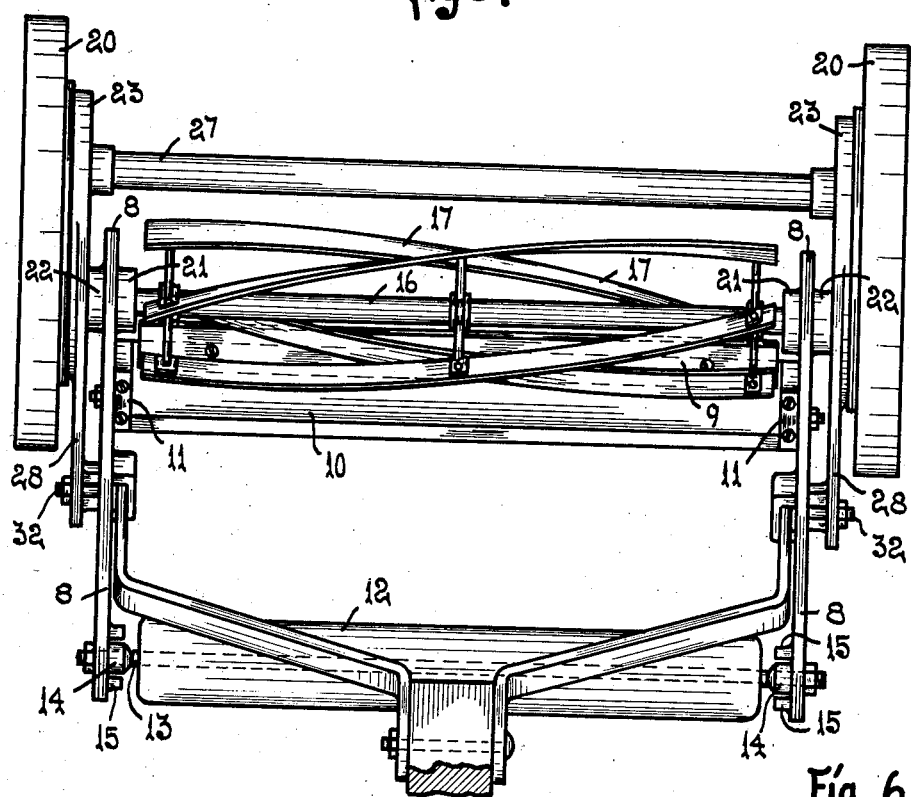
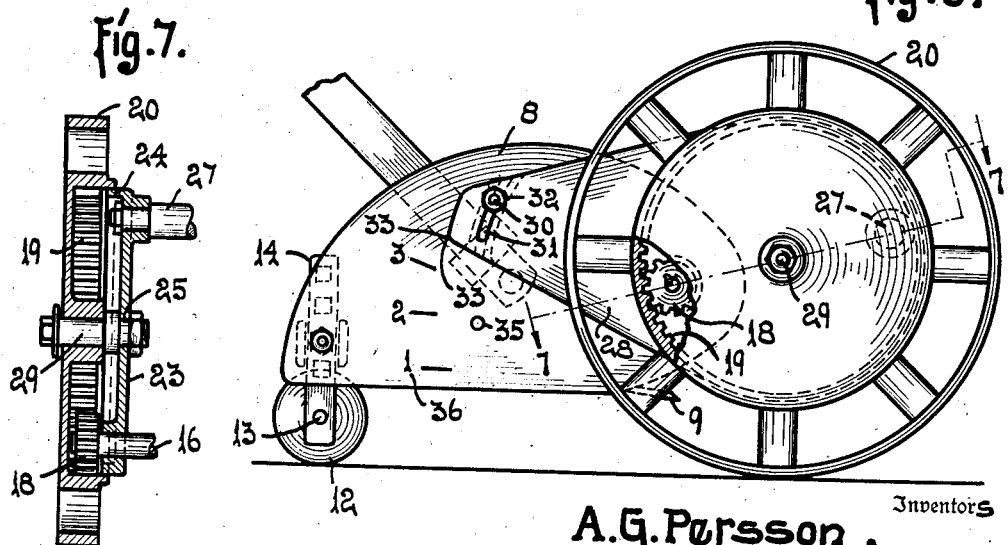
Inventors
A. G. Persson,
C. T. Fornstrom.
By Hiram A. Sturges  Attorney Patented Feb. 28, 1939

2,148,835

UNITED STATES PATENT OFFICE 2,148,835

LAWN MOWER

Anders G. Persson and Carl T. Fornstrom, Omaha, Nebr.

Application July 2, 1938, Serial No. 217,208

3 Claims. (Cl. 56—254)

This invention relates to an improvement in lawn mowers, and has reference, particularly, to adjustable features to permit the cutting of grass at selected distances from the ground, so that the grass-roots will be protected from the effects of drouth, and that the normal appearance of the lawn will not be materially changed.

Nearly all kinds of lawn mowers have heretofore been provided with adjustments intended to accomplish the above named purpose, but so far as observed, none of these constructions permit the horizontal ledger-blade, after adjustments have been made, to be disposed below and at right-angles to the vertical plane of the revoluble cutter-member of the mower.

It is an object of the invention to provide a lawn mower adapted for use in cutting grass close to the ground, and adapted to be adjusted for use in cutting and leaving a stubble of selected height, the construction being such that the horizontal, stationary ledger-blade and revoluble cutter-member may be coincidently lifted to a selected height and maintained with the horizontal ledger-blade disposed in a plane below and at right-angles to the vertical plane of the revoluble cutter-member, so that the grass may be effectively cut when the parts are elevated as well as before elevation, said construction to consist of few and simple parts for economical manufacture and convenience in use.

This invention consists of the new and useful construction, combination and arrangement of parts as described herein and claimed, and as shown in the accompanying drawings, it being understood that changes may be made in form, size, proportions and minor details, said changes being within the scope of the invention as claimed.

In the drawings,

Fig. 5 is a plan view of the lawn mower. Fig. 6 is an end view of the mower showing the relative position of parts when the cutting devices have been elevated, and Fig. 7 is a sectional view on line 7—7 of Fig. 6, showing the mounting of the combined adjusting-disc and buffer on the shaft of a traction wheel.

Figure 4:
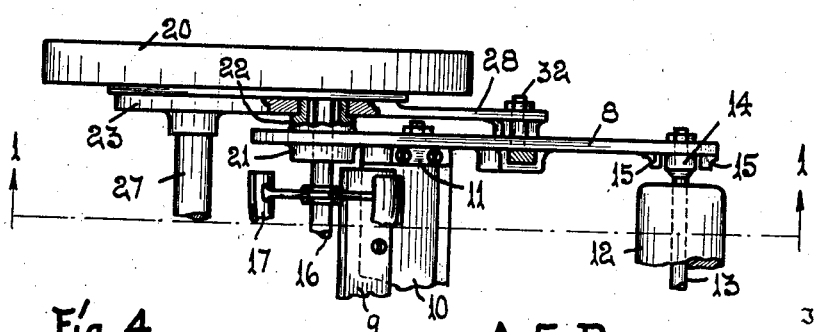
Fig. 4 is a plan view of the parts shown in Fig. 1.

Referring now to the drawings for a more particular description, we provide a pair of opposed, parallel side plates 8. Numeral 9 indicates the ledger-blade which is disposed between and secured at its ends to the side plates 8, said blade being supported its entire length by a stabilizing bar 10 which is secured at its ends to brackets 11, said brackets being adjustably mounted on the side plates, as best shown in Fig. 4 of the drawings.

The roller for the mower is indicated at 12, and its shaft 13 is adapted to be adjusted vertically relative to the side plates, said shaft being journalled in apertured standards 14 which are mounted in brackets 15.

The rotatable cutter-member consists of a shaft 16 and its blades 17, said shaft being provided at its ends with pinion wheels 18 which engage the gear teeth 19 of the traction wheels 20.

Each side plate is provided with a pair of opposed lugs or collars 21 and 22 in which the shaft 16 of the cutter-member is journalled, said lugs also operating as spacing-members.

Numerals 23 indicate a pair of combined adjusting-discs and buffers, each provided with a peripheral flange 24 and apertures 25 and 26, said discs being relatively connected by a stabilizing-rod 27, and each disc is provided with a projection or adjusting-arm 28.

Members 23 are adapted to have limited swinging movements on their pivotal mountings upon the stub shafts 29 which also provide the axial mountings for the traction wheels 20, said shafts 29 engaging in apertures 25 of said discs.

The discs are also pivotally mounted on the lugs 21 and 22 of the side plates 8, said lugs engaging in the apertures 26 of the discs.

On account of this last named construction, an upward swinging movement of the arms 28 will cause coincident upward movements of the shaft 16 of the rotatable cutter-member and ledger-blade 9, and after they have been elevated to a suitable height the arms 28 may be secured to the side plates 8 by any suitable means, the means herein shown being threaded bolts 30 carried by the side plates 8 adapted to engage in the slots 31 of said arms, said bolts preferably being provided with nuts 32 so that, after an adjustment has been made by use of these cooperating devices, the parts will be firmly held relative to each other.

Since the peripheral flange 24 of each disc 23 is disposed closely adjacent the gear teeth 19 of the traction wheels, said discs will operate as shields or buffer members to prevent cut-grass or other loose material from engaging or clogging the gear teeth 19 of the traction wheels.

Since the arms 28 are disposed at the ends of the lawn mower they are accessible, and may be conveniently moved upwardly or downwardly when adjustments are required. It will be noted that these arms are fulcrumed on the stub-shafts 29 and therefore, in the appended claims, we do not wish to be limited to the use of the discs 23, and broadly may claim the adjusting arms 28 fulcrumed, as mentioned, on the stub shafts 29 for elevating or lowering the ledger-blade and rotatable cutter-member.

In the operation of this lawn mower it will be appreciated that when the shaft 16 and side plates and ledger-blade have been coincidently elevated, and the roller 12 has been adjusted, the ledger-blade will be disposed at the bottom and at right-angles to the vertical plane of the rotatable cutter-member, and therefore the grass may be effectively cut.

When the arms 28 are swung upwardly the front ends of the side plates will also swing upwardly, and therefore the rear ends of the side plates must be elevated by an adjustment of the roller 12, so that the ledger-blade will be disposed in its normal position.

Numerals 33 indicate markers or lugs for the ends of arms 28, and at 34 and 35 (Figs. 1, 6) are indicated apertures formed in the side plates for receiving the bolts 30 when the adjustments are made as above mentioned, and at 36 are indicated markings or numerals which are provided for the side plates, and therefore an operator may refer to these markings when making these adjustments to determine the desired height of grass for a lawn after cutting has been accomplished.

Figure 1:
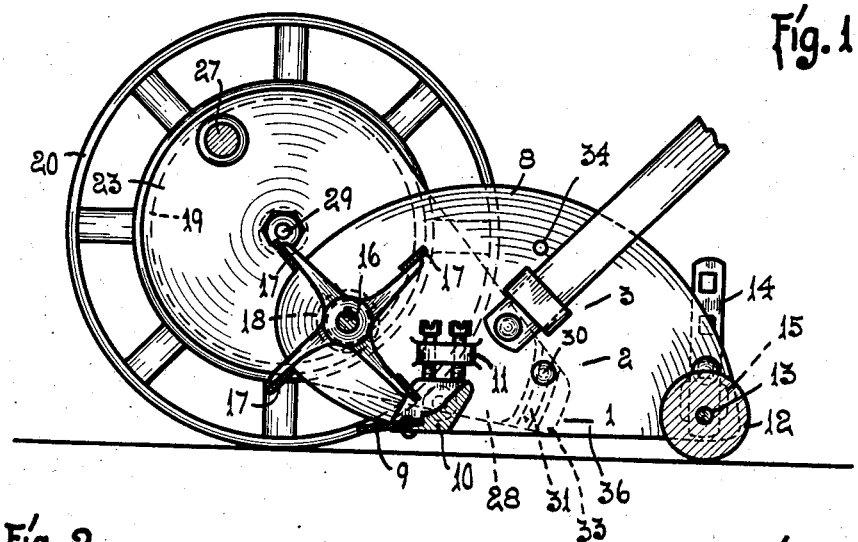
Fig. 1 is a view showing the inner side of an end portion of the mower, parts being in section on line 1—1 of Fig. 4.
Figures 2, 3:
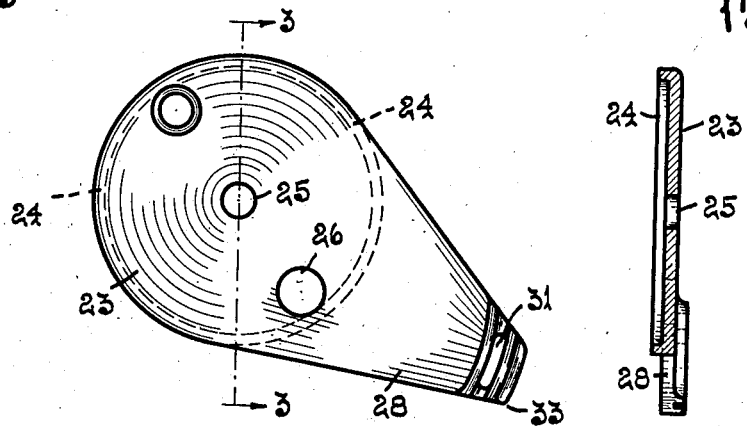
Fig. 2 is a side view of a combined adjusting-disc and buffer.
Fig. 3 is a sectional view of same on line 3—3 of Fig. 2.

The upper aperture 34 in a side plate 8 is shown in Fig. 1, and the lower aperture 35 is shown in Fig. 6. In operation, when it is desired to cut close to the ground, the arms 28 may be swung downwardly and the bolts 30 may engage in the apertures 35 of the side plates, and the bolts 30 may engage in apertures 34 when the cutting of grass occurs further above the ground.

We claim as our invention,—

1. A lawn mower comprising a pair of side plates, a pair of stub shafts, a pair of traction wheels mounted on the stub shafts, a ledger blade secured to the side plates, a pair of apertured discs each pivotally mounted on a stub shaft and provided with a slotted arm, a rotatable cutter-shaft disposed parallel with the ledger blade and journalled in the side plates and discs, said discs and arms thereof being movable on the stub shafts for coincidently elevating or lowering the side plates, said ledger blade and cutter-shaft and keepers on the side plates engaging in the slots for attaching said arms to selected parts of the side plates.

2. A lawn mower comprising a pair of side plates, a pair of stub shafts, a pair of traction wheels mounted on the stub shafts and provided with ring gears, a ledger blade secured to the side plates, a pair of apertured discs disposed between the traction wheels and side plates and mounted on the stub shafts each disc being provided with a slotted arm and having a peripheral flange disposed adjacent a ring gear of a traction wheel, a rotatable cutter-shaft journalled in the side plates and discs, said discs and arms thereof being movable on the stub shafts for coincidently elevating or lowering the side plates, the cutter-shaft and ledger blade, and a pair of keepers each carried by a side plate for engaging in a slot for securing the arm of a disc to a side plate.

3. A lawn mower comprising a pair of side plates each provided with an upper and lower aperture, a pair of stub shafts, a pair of traction wheels mounted on the stub shafts, a ledger blade secured to the side plates, a pair of apertured discs between the traction wheels and side plates each pivotally mounted on a stub shaft and provided with a slotted arm, a rotatable cutter-shaft journalled in the side plates and discs, said discs and arms being movable on the stub shafts for disposing said arms with their slots in register with selected upper or lower apertures of the side plates for coincidently elevating or lowering the side plates, ledger blade and cutter shaft, and keepers adapted to engage in said slots and selected apertures for securing said arms to the side plates.

ANDERS G. PERSSON.
CARL T. FORNSTROM.